(12) United States Patent
Suzuki et al.

(10) Patent No.: US 11,513,512 B2
(45) Date of Patent: Nov. 29, 2022

(54) REMOTE DRIVING SERVICE PROCESSING DEVICE

(71) Applicant: TOYOTA JIDOSHA KABUSHIKI KAISHA, Toyota (JP)

(72) Inventors: Yuji Suzuki, Toyota (JP); Mutsumi Matsuura, Okazaki (JP); Tomoaki Miyazawa, Nagoya (JP); Toshiki Kindo, Yokohama (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 16/930,971

(22) Filed: Jul. 16, 2020

(65) Prior Publication Data

US 2021/0041865 A1 Feb. 11, 2021

(30) Foreign Application Priority Data

Aug. 7, 2019 (JP) .............................. JP2019-145681

(51) Int. Cl.
| | |
|---|---|
| *G05D 1/00* | (2006.01) |
| *H04W 4/44* | (2018.01) |
| *G06Q 50/30* | (2012.01) |
| *G06Q 20/10* | (2012.01) |

(Continued)

(52) U.S. Cl.
CPC ......... *G05D 1/0022* (2013.01); *G06Q 20/108* (2013.01); *G06Q 40/02* (2013.01);

(Continued)

(58) Field of Classification Search
CPC ............... G05D 1/0022; G05D 1/0088; G05D 2201/0212; G05D 2201/0213;

(Continued)

(56) References Cited

U.S. PATENT DOCUMENTS 9,488,484 B2 * 11/2016 Lord ....................... G01C 21/34
9,494,439 B1 * 11/2016 Ross .................... G05D 1/0287

(Continued)

FOREIGN PATENT DOCUMENTS

| CN | 107294926 A | 10/2017 |
|---|---|---|
| JP | 2018-190317 A | 11/2018 |

(Continued)

*Primary Examiner* — Muhammad Shafi
(74) *Attorney, Agent, or Firm* — Oliff PLC

(57) ABSTRACT

A remote driving service processing device includes: a general user terminal by which a requester applies for a remote driving service for moving a vehicle to a destination; a remote control terminal by which a remote driver remotely control the vehicle and sends a remote driving service termination permission request for terminating the remote driving service when the vehicle is having difficulty reaching the destination; and a server that sends a termination approval to the remote control terminal and terminates the remote driving service when (i) transferring the remote driving service termination permission request received from the remote control terminal to the general user terminal, and (ii) receiving a remote driving service termination consent, which is a response to the remote driving service termination permission request, from the general user terminal.

5 Claims, 3 Drawing Sheets

(51) Int. Cl.
*G06Q 40/02* (2012.01)
*B60W 60/00* (2020.01)
*G06Q 50/18* (2012.01)

(52) U.S. Cl.
CPC .............. *G06Q 50/30* (2013.01); *H04W 4/44* (2018.02); *B60W 60/005* (2020.02); *G05D 1/0088* (2013.01); *G05D 2201/0212* (2013.01); *G05D 2201/0213* (2013.01); *G06Q 50/182* (2013.01)

(58) Field of Classification Search
CPC .... G05D 1/0011; G06Q 20/108; G06Q 40/02; G06Q 50/30; G06Q 50/182; G06Q 20/085; H04W 4/44; H04W 4/40; B60W 60/005; G08G 1/09; B60R 16/0231; B60R 2300/10
USPC .............................................................. 701/2
See application file for complete search history.

(56) References Cited

U.S. PATENT DOCUMENTS

| | | | | |
|---|---|---|---|---|
| 9,599,481 | B2* | 3/2017 | Lord | G06Q 10/06 |
| 2016/0209220 | A1* | 7/2016 | Laetz | G06Q 10/047 |
| 2016/0361970 | A1* | 12/2016 | Pebbles | B60W 30/08 |
| 2016/0364812 | A1* | 12/2016 | Cao | G06Q 50/30 |
| 2019/0064805 | A1* | 2/2019 | Frazzoli | G05D 1/0246 |
| 2019/0108539 | A1 | 4/2019 | Watanabe et al. | |
| 2019/0361430 | A1* | 11/2019 | Nelson | G06Q 20/127 |

FOREIGN PATENT DOCUMENTS

| | | | |
|---|---|---|---|
| JP | 2018-206187 A | | 12/2018 |
| JP | 2018206187 | * | 12/2018 |
| JP | 2019-070951 A | | 5/2019 |
| KR | 10-2006-0089815 A | | 8/2006 |
| KR | 20150080724 | * | 7/2015 |

* cited by examiner

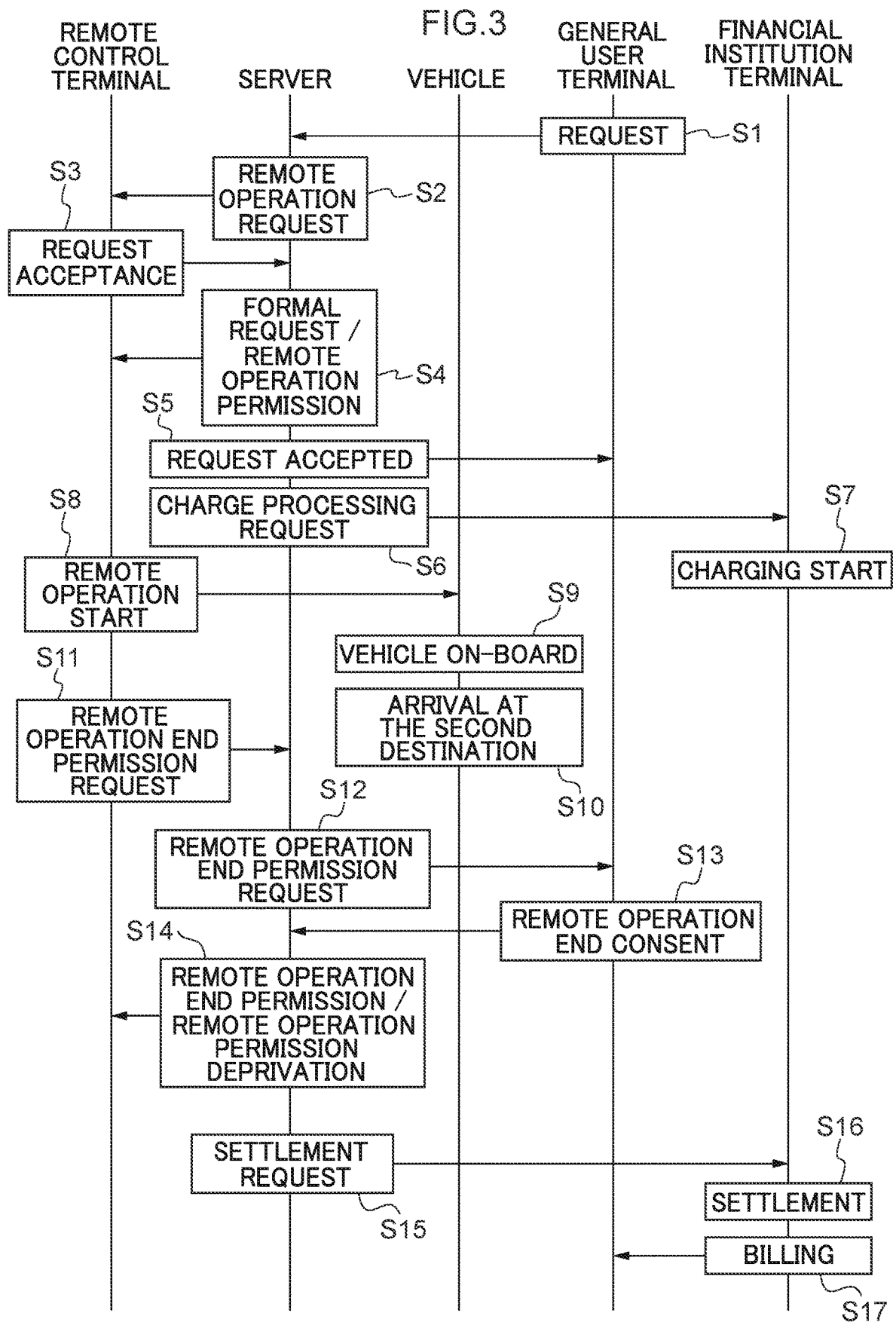

REMOTE DRIVING SERVICE PROCESSING DEVICE

CROSS-REFERENCE TO RELATED APPLICATION

This application is based on and claims priority under 35 USC 119 from Japanese Patent Application No. 2019-145681 filed on Aug. 7, 2019, the disclosure of which is incorporated by reference herein.

TECHNICAL FIELD

The present disclosure relates to a remote driving service processing device.

RELATED ART

A service of transporting people or luggage by remote driving in which a vehicle is operated by a remote driver located in a remote place is being studied.

Japanese Patent Application Laid-Open No. 2018-206187 (Patent Document 1) discloses an invention of a remote driving control device that performs a remote driving service for carrying a person using a vehicle.

According to the invention described in Patent Document 1, it is possible to determine a position where the vehicle should be stopped from plural stop position candidates located near the destination. This allows for flexibility in service operation. However, when the operation of the vehicle is hindered by traffic jams or the like, the remote driving service cannot be terminated until the vehicle arrives at the destination. Therefore, there is a risk that the remote driving service will be needlessly continued without notice.

SUMMARY

In view of the above facts, it is an object of the present disclosure to provide a remote driving service processing device capable of terminating a remote driving service based on an agreement between a requester of a remote driving service and a remote driver who remotely operates (remotely drives) a vehicle with the remote driving service.

A remote driving service processing device according to a first aspect includes: a general user terminal by which a requester applies for a remote driving service for moving a vehicle to a destination; a remote control terminal by which a remote driver remotely controls the vehicle and sends a remote driving service termination permission request for terminating the remote driving service when the vehicle is having difficulty reaching the destination; and a server that sends a termination approval to the remote control terminal and terminates the remote driving service when (i) transferring the remote driving service termination permission request received from the remote control terminal to the general user terminal, and (ii) receiving a remote driving service termination consent, which is a response to the remote driving service termination permission request, from the general user terminal.

According to the remote driving service processing device according to the first aspect, the server mediates consent between the requester of the remote driving service and the remote driver. Thus, the remote driving service can be terminated based on the agreement between the remote driving service requester and the remote driver.

The remote driving service processing device according to the second aspect is the first aspect further including: a financial institution terminal that performs settlement of the remote driving service, wherein the server requests the financial institution terminal to execute settlement of the remote driving service when receiving the remote driving service termination consent from the general user terminal.

According to the remote driving service processing device according to the second aspect, after the remote driving service is terminated based on an agreement between the remote driving service requester and the remote driver, settlement of the remote driving service via the financial institution can be performed.

As described above, according to the remote driving service processing device according to the present disclosure, it is possible to terminate the remote driving service based on the agreement between the remote driving service requester and the remote driver.

BRIEF DESCRIPTION OF DRAWINGS

FIG. 3 is a sequence diagram illustrating an example of a process of the remote driving service processing device according to the embodiment of the present disclosure.

DETAILED DESCRIPTION

Figure 1:
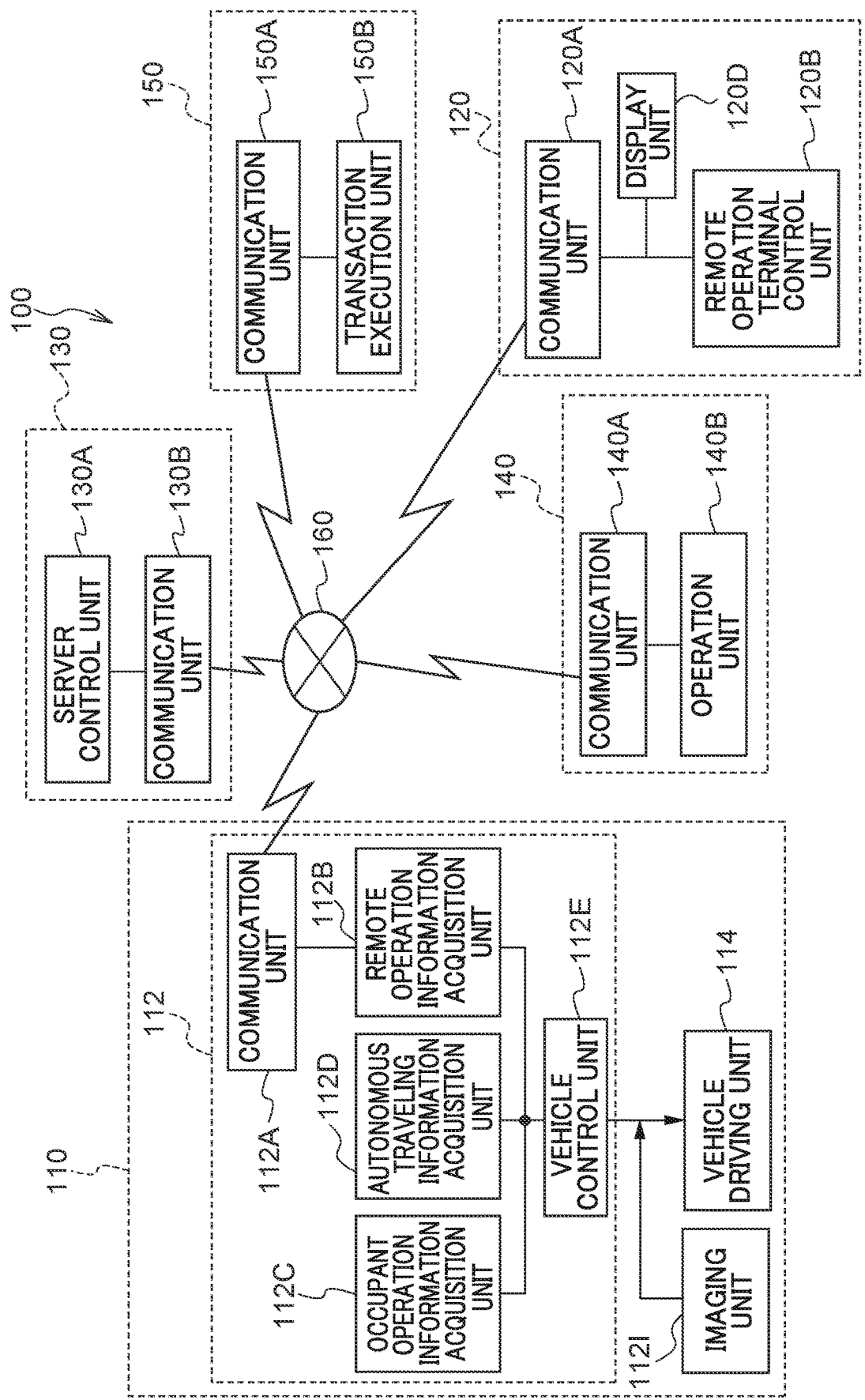
FIG. 1 is a block diagram illustrating an example of a specific configuration of a remote driving service processing device according to an embodiment of the present disclosure.

Hereinafter, the remote driving service processing device according to the present embodiment will be described with reference to FIG. 1. FIG. 1 is a block diagram illustrating an example of a specific configuration of the remote driving service processing device 100 according to the embodiment of the present disclosure.

As shown in FIG. 1, the remote driving service processing device 100 of the present embodiment includes a vehicle 110, a remote control terminal 120, a server 130, a general user terminal 140, and a financial institution terminal 150. The vehicle 110, the remote control terminal 120, the server 130, the general user terminal 140, and the financial institution terminal 150 are connected via a network 160. The network 160 is, for example, a wired or wireless communication network using a public line such as the Internet.

The vehicle 110 includes an ECU (Electronic Control Unit) 112 that controls the running of the vehicle, a vehicle driving unit 114 that drives the vehicle according to a control signal from the ECU 112, and an imaging unit 112I to acquire image data around the vehicle 110 for remote driving.

The ECU 112 functionally includes, as shown in FIG. 1, a communication unit 112A, a remote operation information acquisition unit 112B, an occupant operation information acquisition unit 112C, an autonomous traveling information acquisition unit 112D, and a vehicle control unit 112E.

The communication unit 112A sends and receives information to and from another device. The communication unit 112A is a communication device capable of wireless communication via the network 160 by so-called V2X (vehicle-to-vehicle communication and road-to-vehicle communication).

Remote operation information acquisition section 112B acquires operation information sent from the remote control terminal 120. The operation information sent from the remote control terminal 120 is operation information input to the remote control terminal 120 by the remote driver.

The occupant operation information acquisition unit 112C acquires operation information input from an occupant in the vehicle. The information input from the occupant includes the steering angle, the throttle opening amount, the depressing strength of the brake pedal, the position of the shift lever, and the like.

The autonomous traveling information acquisition unit 112D acquires information relating to autonomous traveling. For example, the information regarding the autonomous traveling includes a control signal from another ECU, position information of the vehicle 110 acquired by a GPS (Global Positioning System), or various sensors (an imaging device, a laser radar sensor, etc.) mounted on the vehicle 110. The position information of the vehicle 110 obtained by GPS or the like is sent to the server 130 and the remote control terminal 120, and is used by the server 130 and the remote driver to grasp the position and the moving state of the vehicle 110.

The vehicle control unit 112E controls the driving of the vehicle driving unit 114 based on the various types of information acquired by the remote operation information acquisition unit 112B, the occupant operation information acquisition unit 112C, and the autonomous traveling information acquisition unit 112D. For example, the vehicle control unit 112E switches between remote operation, occupant operation, and autonomous traveling based on the obtained various information.

The imaging unit 112I is an imaging device such as a video camera that captures an image of the periphery of the vehicle 110, including the front, left and right sides, and the rear of the vehicle 110. Image data around the vehicle 110 acquired by the imaging unit 112I is sent to the communication unit 120A of the remote control terminal 120 via the communication unit 112A and the network 160. The image data sent to the communication unit 120A of the remote control terminal 120 is displayed on the display unit 120D of the remote control terminal 120, and serves as visual information when the remote driver performs remote driving. The display unit 120D also displays an image of the interior of the vehicle 110. The remote driver can observe the state of the occupant from the image of the vehicle compartment displayed on the display unit 120D. In addition, the display unit 120D may have a function as a videophone that allows not only an image in the vehicle compartment to be displayed but also a two-way conversation between the occupant in the vehicle compartment and the remote driver.

As shown in FIG. 1, the remote control terminal 120 functionally includes a communication unit 120A, a remote operation terminal control unit 120B, and a display unit 120D on which an image around the vehicle 110 is displayed. As an example, the remote control terminal 120 includes interfaces corresponding to a steering wheel, an accelerator pedal, a brake pedal, and a shift lever, respectively, and is configured to be capable of performing the same operation as that of a real vehicle. The display unit 120D is a display device such as a liquid crystal display or an organic EL that can display the surroundings of the vehicle 110 including the front, left, right, and rear sides of the vehicle 110. The display unit 120D may be a kind of VR goggles that are mounted so as to cover both eyes of the remote driver and allow the remote driver to stereoscopically view an image around the vehicle 110 in three dimensions.

The communication unit 120A is a communication device capable of performing communication via the network 160. The interface between the communication unit 120A and the network 160 may be wired or wireless.

The remote operation terminal control unit 120B controls the remote control terminal 120. For example, the remote operation terminal control unit 120B acquires the operation information input from the remote driver, and controls the communication unit 120A to send the operation information to the server 130.

The server 130 functionally includes a server control unit 130A and a communication unit 130B, as shown in FIG. 1. The communication unit 130B is a communication device that can perform communication via the network 160. The interface between the communication unit 130B and the network 160 may be wired or wireless.

The server control unit 130A controls the server 130. For example, the server control unit 130A sends a remote operation request to the communication unit 120A of the remote control terminal 120 when the general user terminal 140 requests remote operation, as described later. Then, when the request reception is sent from the remote control terminal 120, the server control unit 130A sends the formal request and the remote driving authority grant to the communication unit 120A of the remote control terminal 120. Further, the server control unit 130A controls the communication unit 130B so as to send the request reception to the communication unit 140A of the general user terminal 140.

In the present embodiment, the remote control terminal 120 to which the server 130 has given remote driving permission remotely controls the vehicle 110 via the network 160. Communication between the remote control terminal 120 and the vehicle 110 may be performed via the server 130. However, via the server 130, communication and control delays may become noticeable. Therefore, in the present embodiment, communication between vehicle 110 and remote control terminal 120 in remote driving of vehicle 110 does not go through the server 130.

The general user terminal 140 is a personal terminal such as a PC or a portable information terminal having a communication unit 140A capable of communicating via the network 160. A general user who receives the benefit of the remote driving service operates the operation unit 140B such as a mouse, a keyboard, or a touch panel to request the server 130 for the remote driving. The request by the operation of the operation unit 140B is sent from the communication unit 140A to the communication unit 130B of the server 130 via the network 160.

In addition, to the communication unit 140A of the general user terminal 140, a communication such as request reception and request completion is sent from the communication unit 130B of the server 130 via the network 160.

The financial institution terminal 150 is a terminal of an institution such as a card company that performs settlement (charging and payment). The financial institution terminal 150 is a terminal such as a PC provided with a communication unit 150A capable of communicating via the network 160 and a transaction execution unit 150B capable of performing settlement processing using a credit card or the like. The financial institution terminal 150 starts a charging process associated with the remote driving service based on the charging process request sent from the server 130, as described later. Then, the financial institution terminal 150 performs settlement of the remote driving service in accordance with the settlement request from the server 130. Further, the financial institution terminal 150 charges the amount based on the settlement request to the general user terminal 140 requesting the remote driving service.

Figure 2:
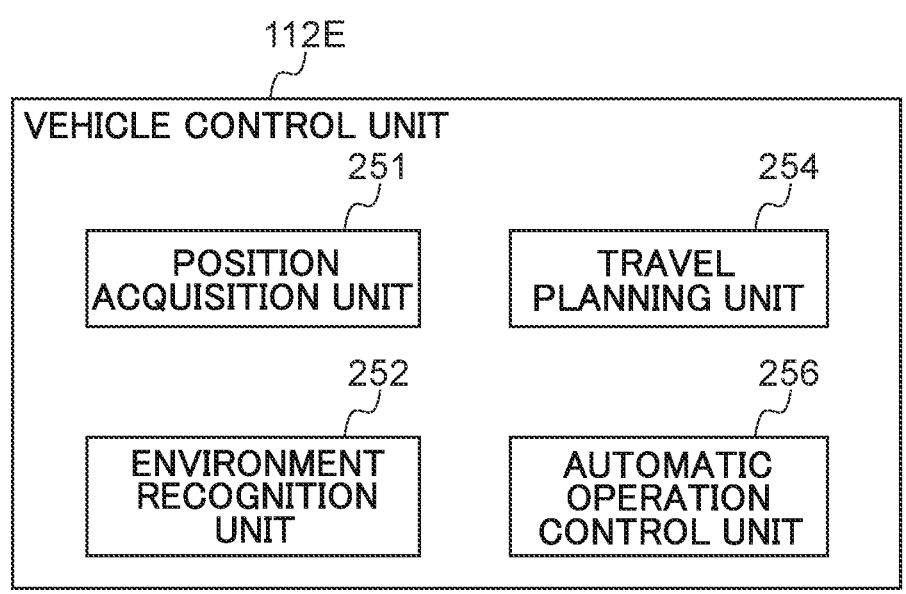
FIG. 2 is a block diagram illustrating an example of a functional configuration of a vehicle control unit.

FIG. 2 is a block diagram illustrating an example of a functional configuration of the vehicle control unit 112E. As shown in FIG. 2, the vehicle control unit 112E includes a position acquisition unit 251, an environment recognition unit 252, a travel planning unit 254, and an automatic driving control unit 256. Each functional configuration is realized by the vehicle control unit 112E reading an execution program stored in the storage device and executing the program.

The position acquisition unit 251 has a function of acquiring the current position of the vehicle 110. The position acquisition unit 251 acquires position information using a GPS or the like.

The environment recognition unit 252 has a function of recognizing a traveling environment around the vehicle 110. The environment recognition unit 252 acquires the traveling environment of the vehicle 110 as traveling environment information from sensor signals from various sensors mounted on the vehicle 110. The "traveling environment information" includes the weather, brightness, width of the running road, obstacles, and the like around the vehicle 110.

The travel planning unit 254 has a function of drafting a travel plan of the vehicle 110 from the departure place to the destination via one or more transit points.

The automatic driving control unit 256 has a function of causing the vehicle 110 to travel according to a planned travel plan while considering the position information and the travel environment information.

FIG. 3 is a sequence diagram illustrating an example of a process of the remote driving service processing device 100 according to the present embodiment. The remote driving service according to the present embodiment can stop vehicle 110 at plural destinations. In FIG. 3, as an example, it is possible to stop the vehicle 110 at two places: a first destination or a second destination closer to the departure place than the first destination. However, the vehicle 110 may be stopped at two or more locations.

In step S1, a request for remote driving is sent from the general user terminal 140 to the server 130.

In step S2, a request for remote driving is sent from the server 130 to the remote control terminal 120. Then, in step S3, a request acceptance is sent from the remote control terminal 120 to the server 130.

In step S4, the server 130 gives the remote control terminal 120 a formal request for remote driving and the permission of remote operation for remotely operating the vehicle 110. After the permission in step S4, communication regarding the remote driving operation on the remote control terminal 120 can be performed between the remote control terminal 120 and the vehicle 110 via the network 160 without using the server 130. In step S5, the server 130 sends a request acceptance to the general user terminal 140.

In step S6, a charging processing request is sent from server 130 to financial institution terminal 150. In step S7, a charging process is started by an operation on the financial institution terminal 150.

In step S8, the remote driving of the vehicle 110 is started according to the operation from the remote control terminal 120. Then, in step S9, a person or luggage is mounted on the vehicle 110.

In step S10, the vehicle 110 arrives at a second destination existing on the way to the first destination, which is the original destination. In the present embodiment, it is assumed that the traveling of vehicle 110 is hindered by traffic congestion or the like, and it is difficult to arrive at the first destination. Therefore, when the vehicle 110 arrives at the second destination before the first destination in step S10, a considerable time has elapsed since the vehicle departed.

In step S11, a request for permission to end (terminate) remote driving (operation) is sent from the remote control terminal 120 to the server 130 at the discretion of the remote driver. Then, in step S12, a request for permission to end remote operation is sent from server 130 to general user terminal 140.

In step S13, the general user terminal 140 sends to the server 130 a remote operation end consent to end the remote driving service. Then, in step S14, the server 130 sends a permission to end the remote operation to the remote control terminal 120, and the remote control terminal 120 has its permission for the remote driving deprived (terminated). After the remote control terminal 120 has been deprived of the permission for remote driving, the vehicle 110 autonomously runs to a predetermined place such as a garage.

In step S15, the server 130 sends a settlement request to the financial institution terminal 150 by ending the remote driving service. In step S16, the financial institution terminal 150 performs settlement of the remote driving service. Then, in step S17, a billing for a remote driving service is made from the financial institution terminal 150 to the general user terminal 140.

As described above, according to the present embodiment, the requester of the remote driving service and the remote driver consent via the server 130. This makes it possible to end the remote driving service. In particular, when the traffic of the vehicle 110 is hindered by traffic congestion, it takes extra time to arrive at the original destination, and it is difficult to arrive at the original destination. However, in the present embodiment, when it is difficult for the vehicle 110 to reach the original destination, the server 130 mediates consent between the requester of the remote driving service and the remote driver. This makes it possible to end the remote driving service based on the agreement between the remote driving service requester and the remote driver. Further, in the present embodiment, settlement process is performed based on an agreement between the requester of the remote driving service and the remote driver. This makes it possible to end the remote driving service smoothly.

The general user terminal in the claims corresponds to the general user terminal 140 in the detailed description of the invention, and the remote control terminal in the claims corresponds to the remote control terminal 120 in the detailed description of the invention in the specification. The control unit in the claims corresponds to the server 130 in the detailed description of the invention. The financial institution terminal in the claims corresponds to the financial institution terminal in the detailed description of the invention 150.

What is claimed is:

1. A remote driving service processing device comprising:
   a general user terminal by which a requester applies for a remote driving service for moving a vehicle to a destination;
   a remote control terminal by which a remote driver remotely controls the vehicle and sends a remote driving service termination permission request by the remote driver for terminating the remote driving service when the vehicle is having difficulty reaching the destination; and
   a server that sends a termination approval to the remote control terminal and terminates the remote driving service based on an agreement between the requester and the remote driver by (i) transferring the remote driving service termination permission request by the remote driver received from the remote control terminal to the general user terminal, and (ii) receiving a remote driving service termination consent by the requester, which is a response to the remote driving service termination permission request, from the general user terminal, wherein after the remote control terminal has had the permission for remote driving terminated, the vehicle autonomously runs to a predetermined place.

2. The remote driving service processing device according to claim 1, further comprising:
   a financial institution terminal by which settlement of the remote driving service is performed,
   wherein the server requests the financial institution terminal to execute settlement of the remote driving service when receiving the remote driving service termination consent from the general user terminal.

3. The remote driving service processing device according to claim 2, wherein
   the remote driving service is for moving the vehicle to a plurality of destinations; and
   the remote control terminal sends the remote driving service termination permission request for terminating the remote driving service when the vehicle is having difficulty reaching one of the plurality of destinations.

4. The remote driving service processing device according to claim 1, wherein
   the remote driving service is for moving the vehicle to a plurality of destinations; and
   the remote control terminal sends the remote driving service termination permission request for terminating the remote driving service when the vehicle is having difficulty reaching one of the plurality of destinations.

5. The remote driving service processing device according to claim 1, wherein:
   the server receives a request for remote driving by the requester from the general user terminal, sends the request for remote driving to the remote control terminal, and when a request acceptance by the remote driver is received from the remote control terminal, the server gives the remote control terminal a permission for remote driving of the vehicle; and
   when the server receives the remote driving service termination consent by the requester, the server terminates the permission for remote driving of the vehicle by the remote control terminal.

* * * * *